(12) United States Patent
Rose et al.

(10) Patent No.: US 12,488,792 B2
(45) Date of Patent: *Dec. 2, 2025

(54) REAL-TIME VIDEO CONFERENCE CHAT FILTERING USING MACHINE LEARNING MODELS

(71) Applicant: NVIDIA Corporation, Santa Clara, CA (US)

(72) Inventors: Amy Rose, Chapel Hill, NC (US); Andrew James Woodard, Buckinghamshire (GB); Benjamin Thomas Waine, Cheshunt (GB)

(73) Assignee: NVIDIA Corporation, Santa Clara, CA (US)

( * ) Notice: Subject to any disclaimer, the term of this patent is extended or adjusted under 35 U.S.C. 154(b) by 113 days.

This patent is subject to a terminal disclaimer.

(21) Appl. No.: 18/339,138

(22) Filed: Jun. 21, 2023

(65) Prior Publication Data

US 2023/0335121 A1    Oct. 19, 2023

Related U.S. Application Data

(63) Continuation of application No. 17/085,618, filed on Oct. 30, 2020, now Pat. No. 11,741,949.

(51) Int. Cl.
*G10L 15/18*  (2013.01)
*G06N 3/08*  (2023.01)
(Continued)

(52) U.S. Cl.
CPC ............ *G10L 15/1815* (2013.01); *G06N 3/08* (2013.01); *G10L 15/16* (2013.01); *G10L 15/22* (2013.01);
(Continued)

(58) Field of Classification Search
CPC ..... G10L 15/1815; G10L 15/16; G10L 15/22; G10L 2015/088; G10L 15/26; G06N 3/08;
(Continued)

(56) References Cited

U.S. PATENT DOCUMENTS 9,533,218 B1    1/2017  Lin
10,658,074 B1 *  5/2020  Sorkey ................... G16H 15/00
(Continued)

OTHER PUBLICATIONS

"Natural Language Understanding." What is Conversational AI? Nvidia Developer. Retrieved from the Internet on Sep. 9, 2020 from URL <https://developer.nvidia.com/conversational-ai#nlu>.
(Continued)

*Primary Examiner* — Stella L. Woo
(74) *Attorney, Agent, or Firm* — Iron Summit IP LLP

(57) ABSTRACT

In various examples, as a user is speaking or presenting content during an online video conference, the data stream may be processed to generate a textual representation (e.g., transcript) of the audio and/or information relating to the video. The textual representation and/or video related information may then be processed to determine a context or one or more topic(s) of discussion. Based on the determined context/topic(s), a corresponding neural network(s) may be selected. Once a neural network has been selected, comments may be retrieved from a chat feature of the application and applied to the neural network. The neural network may then output data to indicate the relevance of the comments to the determined discussion topic. Based on the relevance of the comment, the comment may be allowed, prioritized, deleted, de-emphasized, or otherwise filtered in the chat feature.

20 Claims, 8 Drawing Sheets

(51) Int. Cl.
  *G10L 15/08* (2006.01)
  *G10L 15/16* (2006.01)
  *G10L 15/22* (2006.01)
  *H04L 51/046* (2022.01)
  *H04N 7/15* (2006.01)
(52) U.S. Cl.
  CPC ...... *H04L 51/046* (2013.01); *G10L 2015/088* (2013.01); *H04N 7/15* (2013.01)
(58) Field of Classification Search
  CPC ........ G06N 3/045; H04N 7/15; G06F 40/216; G06F 40/30; H04L 12/1827; H04L 51/212
  See application file for complete search history.

(56) References Cited

U.S. PATENT DOCUMENTS

| | | | |
|---|---|---|---|
| 11,030,994 B2 | 6/2021 | Ji et al. | |
| 11,132,509 B1 | 9/2021 | Pasko et al. | |
| 11,741,949 B2 * | 8/2023 | Rose | H04L 51/212 704/232 |
| 2017/0180294 A1 | 6/2017 | Milligan et al. | |
| 2018/0048721 A1 | 2/2018 | Barajas Gonzalez et al. | |
| 2018/0359199 A1 | 12/2018 | Nguyen et al. | |
| 2019/0394511 A1 | 12/2019 | Kalaboukis et al. | |
| 2020/0036761 A1 | 1/2020 | Weinwurm et al. | |
| 2020/0044996 A1 | 2/2020 | Johnson et al. | |
| 2020/0097546 A1 | 3/2020 | Petri et al. | |
| 2020/0177529 A1 | 6/2020 | Trim et al. | |
| 2020/0183975 A1 | 6/2020 | Provost et al. | |
| 2020/0279075 A1 | 9/2020 | Avedissian | |
| 2020/0372066 A1 | 11/2020 | Saggi et al. | |
| 2020/0394360 A1 | 12/2020 | Dunn et al. | |
| 2022/0129905 A1 | 4/2022 | Sethumadhavan et al. | |

OTHER PUBLICATIONS

"Kids' Platforms." Two Hat. Retrieved from the Internet on Oct. 30, 2020 from URL <https://www.twohat.com/solutions/kids-platforms/>.

"Momio protects its young users from bullying and bad behaviour, whilst simultaneously educating them." UTOPIA Analytics 2020. Retrieved from the Internet on Sep. 9, 2020 from URL <https://utopiaanalytics.com/case/case-momio/>.

Rose, Amy; Non-Final Office Action for U.S. Appl. No. 17/085,618, filed Oct. 30, 2020, mailed Sep. 15, 2022, 17 pgs.

Rose, Amy; Final Office Action for U.S. Appl. No. 17/085,618, filed Oct. 30, 2020, mailed Dec. 13, 2022, 11 pgs.

Rose, Amy; Notice of Allowance for U.S. Appl. No. 17/085,618, filed Oct. 30, 2020, mailed Mar. 21, 2023, 7 pgs.

* cited by examiner

REAL-TIME VIDEO CONFERENCE CHAT FILTERING USING MACHINE LEARNING MODELS

CROSS-REFERENCE TO RELATED APPLICATIONS

This application is a continuation of U.S. patent application Ser. No. 17/085,618, filed Oct. 30, 2020 which is incorporated herein by reference in its entirety.

BACKGROUND

Hosts of multi-party video streams—such as online video conferences, game streaming services, video streaming services, etc.—often enable a chat and/or comment feature during a presentation, stream, or video conference to allow attendees to communicate textually—e.g., in the background, while a presentation is taking place. For example, a host (e.g., presenter, teacher, moderator, sharer, etc.) may mute all attendees or viewers of an online video stream, but enable a chat and/or comment box to allow users to type messages to the host or other attendees of the video stream. However, these chat boxes can fill up with off-topic or inappropriate comments. As a result, these off-topic or inappropriate comments may be distracting to the host or attendees, and may result in a diminished user experience. Further, some on-topic comments may be missed by the host or other attendees due to a large volume of off-topic comments.

Traditional systems may provide hosts with the ability to disable chat boxes and/or block all comments associated with a video stream. Alternatively, hosts in these traditional systems may enable only specific users to comment during a video stream. For example, a host may restrict the option to comment in the chat and/or comment box such that only subscribers to a host's channel or service can comment. However, hosts often want to interact with their audience and appreciate on-topic comments from attendees, which may be blocked by these traditional systems. Other traditional systems may provide hosts with a simple word filter to scan and remove some comments as they are submitted. However, these systems merely search for specific words or strings of words—e.g., profane or harassing comments—and remove or overwrite them regardless of context, which still allows off-topic or harassing comments that may not be identified by the word filter to be entered into the chat and/or comment box.

SUMMARY

Embodiments of the present disclosure relate to topic-based real-time video conference chat filters. Systems and methods are disclosed that determine the relevance of text entered into a chat feature by applying the text to a neural network that corresponds to a discussion topic in an application.

In contrast to conventional systems, such as those described above, the present system receives a data stream associated with an application—such as from a host device during an online video conference, video stream, game stream, and/or the like to determine a context—such as a frame of reference, relevant time period, or topic of a discussion—that corresponds to the data stream and to determine relevant content to allow and/or display in a chat feature of the application. According to some examples, as a user is speaking or presenting content during an online video conference, the data stream (e.g., audio data, video data, metadata, etc.) may be processed to generate a textual representation (e.g., transcript) of the audio and/or information relating to the video of the online video conference. In some embodiments, the textual representation and/or video related information may then be processed to determine a context—such as a frame of reference, relevant time period, or topic of a discussion—in a conference, a topic of a video stream, a topic of a game stream, and/or the like. Based on the determined topic(s), a corresponding neural network(s) may be selected. For example, if a teacher is discussing Macbeth during a virtual learning video conference, a neural network that is trained using content relating to Macbeth may be selected based on processing a transcript of the discussion to determine that the user is discussing Macbeth. Once a neural network has been selected, comments may be retrieved and/or intercepted from a chat feature (e.g., a chat box) of the application and applied to the neural network. The neural network may then output data to indicate the relevance of the comments to the determined discussion topic. A corresponding tag may then be associated with each of the comments. For example, comments determined to be relevant may be labeled as 'on-topic' and comments determined to be irrelevant may be labeled as 'off-topic'. Based on the relevance of the comment, the comment may be allowed, prioritized, deleted, de-emphasized, or otherwise filtered in the chat feature. As a result, irrelevant comments may be blocked from being displayed to the users, which may allow the users to focus on the material being discussed in the virtual learning video conference.

In some embodiments, after generating the transcript and/or the video related information, the system may process the information to determine whether the transcript includes a trigger phrase and/or the video information includes a triggering action. Based on the determined trigger phrase or action, one or more response options may be determined. Based on determining that the teacher asked a "yes or no" question (e.g., a trigger phrase), the system may only accept "YES" or "NO" comments entered into the chat feature. In another example, based on the determined question, the system may generate and display a selection box that includes selection buttons that allow students to only choose "YES" or "NO" answer options. Advantageously, the user may collect responses from attendees in an organized manner without enabling an open chat feature.

BRIEF DESCRIPTION OF THE DRAWINGS

The present systems and methods for topic-based real-time video conference chat filters are described in detail below with reference to the attached drawing figures, wherein.

DETAILED DESCRIPTION

Figure 1A:
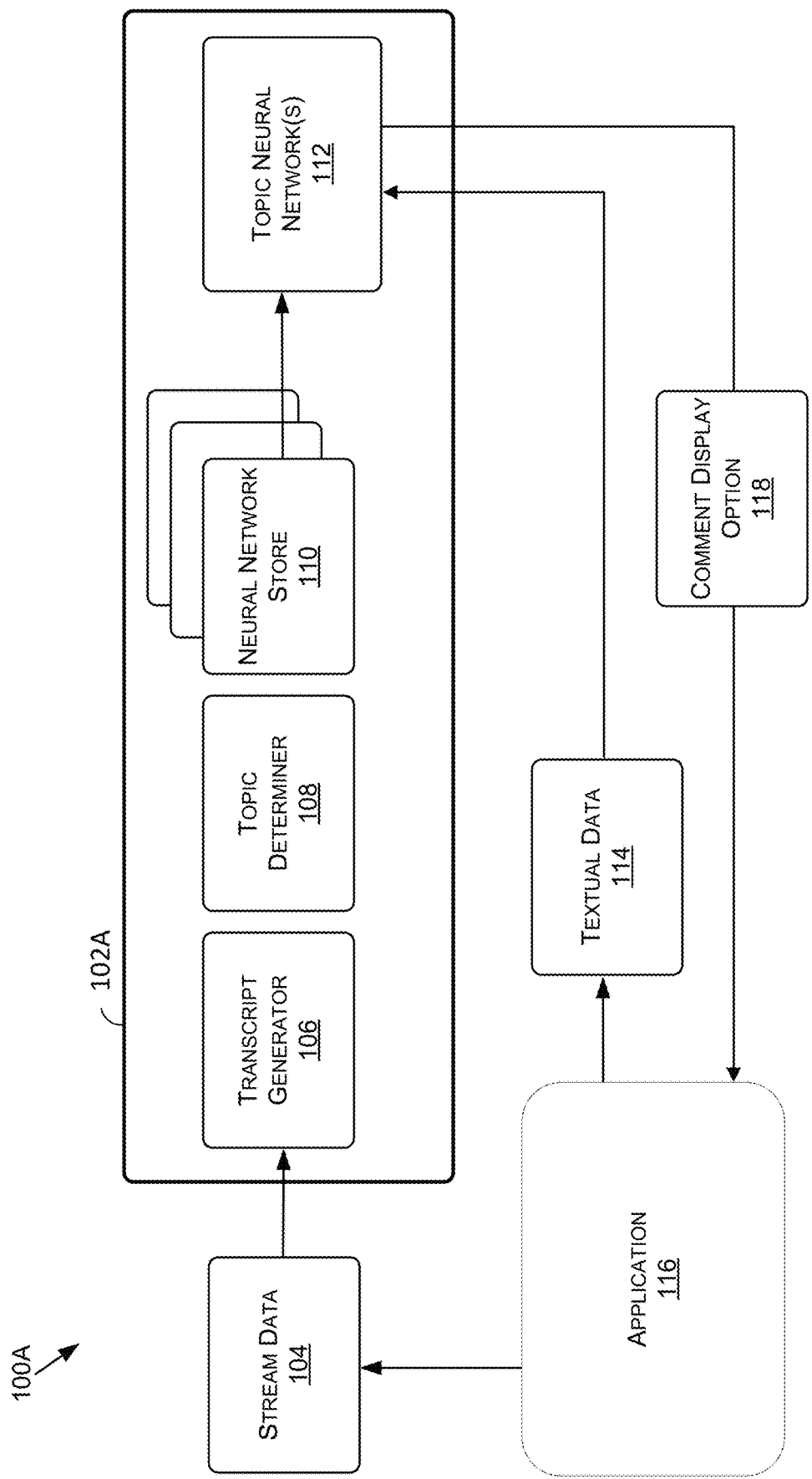
FIGS. 1A and 1B depict data flow diagrams corresponding to processes for chat management systems, in accordance with some embodiments of the present disclosure.

Systems and methods are disclosed related to topic-based real-time video conference chat filters. Although primarily described herein with respect to video streaming implementations, this is not intended to be limiting, and the systems and methods of the present disclosure may be implemented in any implementation for filtering textual data. For non-limiting examples, the systems and methods described herein may be implemented for game streaming applications, video conference applications, virtual learning applications, social media content sharing application, video sharing applications, and/or the like.

In some embodiments, a chat management system may receive a data stream (e.g., audio data, video data, metadata, etc.) associated with an application, such as from a host device during an online video conference, video stream (or playback), game stream, and/or the like. The application may be executed locally and/or may correspond to a streaming application executed within a cloud computing environment. According to some examples, as a user is speaking or presenting content during an online video conference, the data stream may be processed to generate a transcript of the audio and/or information relating to the video. In some embodiments, the data stream may be applied to a natural language processing algorithm (NLP) to generate a transcript of the audio and/or information relating to the video.

In some embodiments, the transcript and/or video related information may then be processed to determine a context (including, without limitation, a frame of reference, or topic) of a discussion in a conference, a video stream, a game stream, and/or the like. The context of the discussion may be determined by processing the transcript to determine one or more keywords associated with a determined context. Further, data representative of the transcript may be applied to a neural network to compute data indicative of the discussion context. Additionally or alternatively, computer vision, machine learning, and/or other methods may be employed to support determining a context or topic based on analysis a video. For example, where a portion of a video may not include any spoken words—such as a stream of gameplay—and/or a transcript may be insufficient for determining a context, frames of the video may be analyzed to extract information from the frames of the video, which may be processed (e.g., by a neural network) to determine a context of the video. Moreover, in further examples, the topic may be determined, at least in part, based on metadata (e.g., title, description, host, creator, and/or author) associated with the data stream. Combinations of any of the above are be included within the scope of the implementations of the present disclosure.

Based on the determined context(s), a corresponding neural network(s) may be selected. The corresponding neural network may be determined from a store of neural networks that may include any number of neural networks, each associated with a context. In some embodiments, the store of neural networks may be organized in a hierarchical data structure, wherein the scope of a neural network in a parent node may be more broad when compared to the scope of a neural network in a child node. For example, a neural network in a parent node of the hierarchical data structure may be trained generally on the work of William Shakespeare, while a child node to the parent node may be trained more specifically on a particular work of Shakespeare's, such as the play Macbeth. Based on a confidence level for a given topic (e.g., determined using keywords, a neural network, or a combination thereof), a more focused or granularly trained neural network may be selected in addition to, or instead of, the broader neural network. By way of further example, if a teacher is discussing Macbeth during a virtual learning video conference, the system may select a first neural network that is trained using content broadly relating to Shakespeare as well as a second neural network that is trained using content specifically relating to Macbeth. As some users may prefer that chat discussions be highly related to the topic of discussion, user settings may be provided to allow a user to establish preferences related to neural network selection. As such, and continuing with the example above, the teacher discussing Macbeth may select, via a user interface, an allowed breadth level that may be used to only allow comments specifically related to Macbeth and filter out comments generally related to Shakespeare. In such an example, the system may select only the neural network that is more narrowly focused on Macbeth.

Once one or more neural network(s) has been selected, textual data may be retrieved from a chat or comment feature of the application and applied to the neural network. For example, when a user types a comment into a text input field of a chat feature and selects to post the comment, prior to being displayed, the comment may be intercepted by the system and textual data associated with the comment may be applied to a selected neural network that corresponds to a topic of discussion. The neural network may then output data to indicate the relevance of the comment to the determined discussion topics, whether the comment is offensive or inoffensive, and/or information related to other characteristics of the textual data. A corresponding tag may then be associated with each of the comments. For example, comments determined to be relevant may be labeled as 'on-topic' and comments determined to be irrelevant may be labeled as 'off-topic'. Additionally or alternatively, the neural network may output data to indicate whether the comment is offensive, harassing, profane or otherwise inappropriate for the topic of discussion.

Based at least in part on the determined relevance of the comment, a display option may be determined for the comment. For example, within the chat feature of the application, the comment may be displayed, prioritized relative to the relevance of other comments, deleted/removed such that the comment is not displayed, de-emphasized, or otherwise filtered. In some embodiments, a filter may be applied only to a portion of the comment. For example, an irrelevant portion of a comment may be deleted or obscured, while the relevant portion of the comment may be displayed within the chat feature. As a result, irrelevant comments may be blocked from being displayed to the users, which may allow the users to focus on the material being discussed in the current instance of the application.

In some embodiments, after generating the transcript and/or the video related information, the system may process the information to determine whether the transcript includes a trigger phrase and/or the video information includes a triggering action. A trigger phrase may be a single word, a single sound, a string of words, and/or a sound pattern. A trigger phrase may be determined based on comparing words from the transcript to a trigger phrase dictionary that includes a set of trigger phrases and determining that one or more words from the transcript correspond to one or more trigger phrases. For example, a user may say, "QUESTION, who did their homework this weekend?" In this example, the word "QUESTION" may be the trigger phrase that the user may state to trigger the system to capture the words following the trigger phrase to perform some action (e.g., generate a prompt to respond in the chat feature based on the question). Additionally or alternatively, data representative of the transcript may be applied to a neural network to compute data indicative of a trigger phrase. A triggering action may be a gesture performed by a user or an input received by the system via a peripheral device. For example, a user may perform a gesture in the air that is captured and processed via computer vision or gesture recognition techniques and/or the user may actuate a button on a presentation remote or graphical user interface to operate as the trigger.

Based on the determined trigger phrase or action, one or more response options may be determined. A response option may be a set of appropriate and/or relevant responses. Further, one or more responses within a chat feature that do not correspond to the one or more response options may be filtered out. For example, a teacher may ask his/her class, "Did you read 'Macbeth' over the weekend?" Based on determining that the teacher asked a question (e.g., a trigger phrase), the system may only accept "YES" or "NO" comments entered into the chat feature. In some embodiments, a graphical element may be generated and populated that corresponds to the one or more response options within the chat or comment feature. For example, based on the determined question, the system may generate and display a selection box that includes selection buttons that allow students to only choose "YES" or "NO" answer options in response to the teacher's question as to whether the students read Macbeth over the weekend.

In some embodiments, the one or more selected neural networks corresponding to a topic of discussion may be used in conjunction with a trigger phrase to generate a selection box with several potential answers. For example, a teacher in a virtual learning video conference may ask, "Who is the main character in Macbeth?" Based at least in part on the question and a selected neural network trained on information related to Macbeth, the system may generate a selection box with four names—one being the main character of Macbeth—from the source material (e.g., the play "Macbeth") or related source materials such as other works from the same author or the author's contemporaries (e.g., other works from Shakespeare).

Figure 1B:
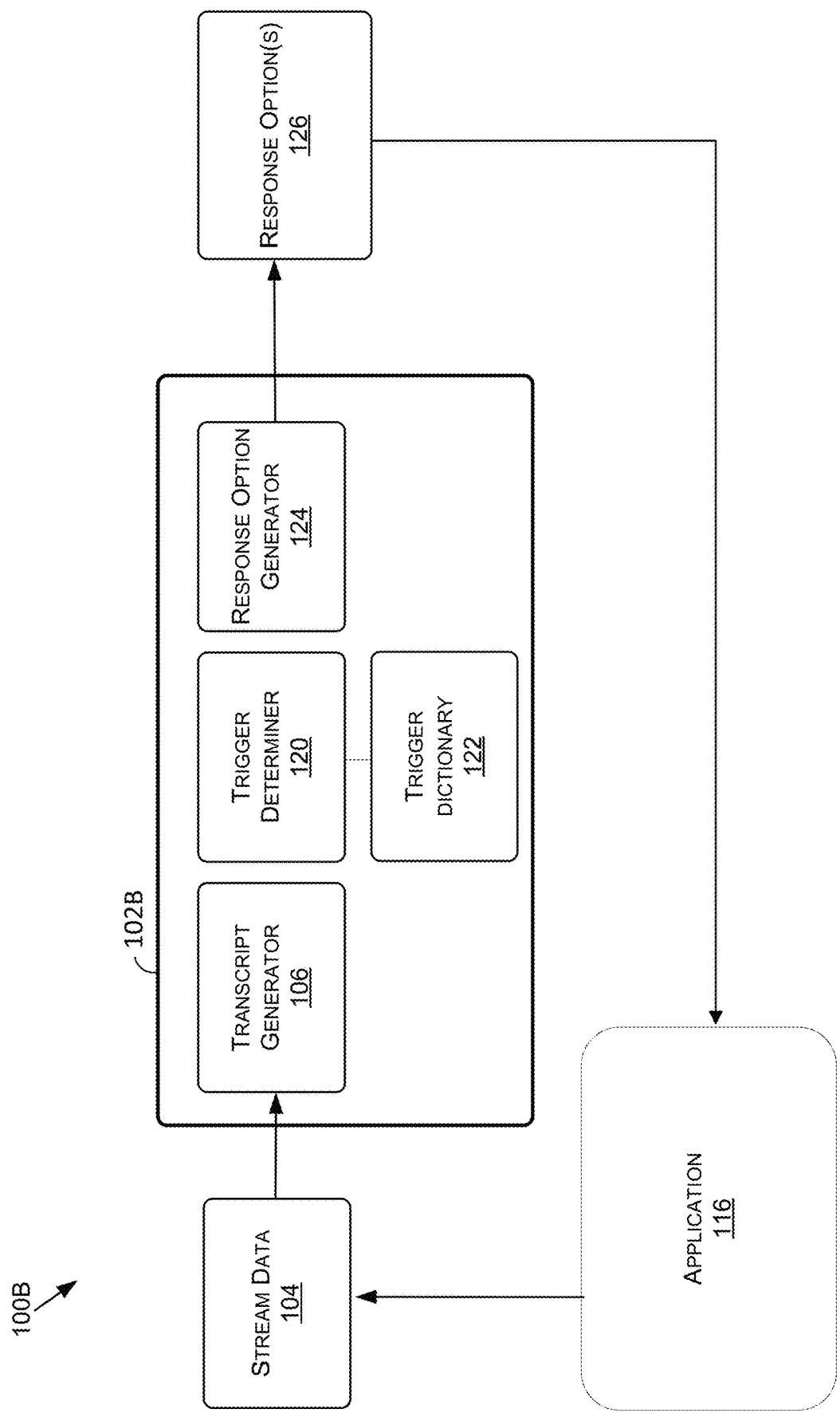

With reference to FIGS. 1A and 1B, FIGS. 1A and 1B depict data flow diagrams corresponding to processes 100A and 100B for chat management systems, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, components, features, and/or functionality described herein with respect to FIGS. 1A and 1B may be executed using example content streaming system 500, example computing device 600, example data center 700, or a combination thereof. For example, the processes 100A and 100B may be executed locally and/or in a cloud computing environment—e.g., using the example content streaming system 500 and/or one or more example data centers 700. Although illustrated separately, the processes 100A and 100B, in embodiments, may be executed together. For example, chat entries and/or comments may be filtered out using the process 100A while graphical elements for pre-defined response options may be populated in a chat or comment feature using the process 100B.

Turning to FIG. 1A, FIG. 1A illustrates an example data flow diagram for a process 100A that may be executed within a chat management system. The chat management system may include a chat manager 102, which includes a transcript generator 106, a topic (or context) determiner 108, and a neural network store 110. The process 100A may further include stream data 104, a selected topic neural network 112, textual data 114, an application 116, and a comment display option 118.

In operation, the chat manager 102 may receive the stream data 104 from the application 116, which may include a chat feature and/or comment feature and be executed locally on a user device and/or may correspond to a cloud-based application executed within a cloud computing environment. The stream data 104 may include data corresponding to words spoken by a user or data corresponding to content presented during an online video conference, video stream, game stream, video playback, and/or the like. In some embodiments, the stream data 104 may correspond to content that is audio-only, video-only, or a combination thereof. Although referred to as stream data 104, this is not intended to be limiting, and in some embodiments the stream data 104 may not be streamed. For example, the stream data 104 may be downloaded, played back, and/or otherwise received without streaming. In embodiments where the stream data 104 is streamed, the stream may correspond to a live stream and/or a previously recorded or stored stream.

The stream data 104 may be passed to the transcript generator 106, and the transcript generator 106 may generate a transcript based on the stream data 104. In some embodiments, the transcript generator 106 may use natural language processing (NLP) to generate a transcript from the stream data 104. For example, a machine learning model(s), a neural network(s), a NLP algorithm, and/or another type of NLP algorithm may be used to generate a transcript from the stream data 104. In some embodiments, in addition to or alternatively from using NLP to process audio data of the stream data 104, video data of the stream data 104 may be processed using a computer vision algorithm(s), a machine learning model(s), a neural network(s), and/or another type of algorithm to determine contextual data, metadata, and/or other information about content. As such, the transcript generator 106 may generate the transcript to include textual data, contextual data, metadata, and/or other data types based on audio data, video data, and/or metadata from the stream data 104.

The transcript (or other textual representation) may then be processed by the topic determiner 108 to determine one or more topics of discussion in a conference, a seminar, a video stream, a game stream, and/or the like. In some examples, the topic determiner 108 may determine the topic of discussion by determining one or more keywords associated with a topic from the transcript, applying data representative of the transcript to a neural network to compute data indicative of the topic, by employing computer vision to analyze frames of video included in the stream data 104 to determine the topic, and/or by analyzing metadata (e.g., title, description, host, creator, and/or author) associated with the stream data 104.

Using the determined topic(s), the chat manager 102 may access the neural network store 100 to select one or more topic neural network(s) 112, each associated with a topic(s). As discussed herein, the topic neural network(s) 112 may be associated with entirely different topics/contexts and/or may be associated with similar topics but with varying scope. For example, the chat manager 102 may select a parent neural network trained on Shakespeare as well as a child neural network trained on Macbeth. While overlap may exist between the topics associated with neural networks, the scope of the child neural network may be more granular than that of the parent neural network.

In some embodiments, the topic neural networks 112 may be trained using training textual data sets (or training video sets, where video is used as input to the topic neural network 112) that relate to associated topics. For example, in the Macbeth example, sample text strings (e.g., retrieved from comments or chats, created for training purposes, and/or the like) may be used as training data. The sample text strings may have associated ground truth data that indicates what the topic neural network 112 should predict—e.g., relevance, appropriateness, etc. As such, data representative of the text strings may be applied to the topic neural network 112, and the topic neural network 112 may compute outputs that indicate the relevance, appropriateness, etc. The outputs may then be compared to the ground truth data using one or more loss functions, and the parameters (e.g., weights and biases) of the topic neural network 112 may be updated using one or more optimization functions (e.g., gradient descent, momentum, adagrad, etc.) until an acceptable level of accuracy is achieved.

Transfer learning may be used in some embodiments. For example, one or more topic neural networks 112 may be trained—at least preliminarily—based on training data for one topic, and the topic neural network 112 may be updated or fine-tuned based on training data from of another topic. As such, in the Macbeth example, the topic neural network 112 may be trained on Shakespeare (or even more broadly, on literature), and the pre-trained topic neural network 112 may be updated (or additionally trained) on training data associated with Macbeth. As another example, a topic neural network 112 may be trained for Macbeth, and then may be retrained or updated for Julius Caesar.

In some embodiments, in addition to or alternatively from a topic neural network 112 being selected based on a determined topic from the transcript, a user (e.g., speaker, presenter, content generator, etc.) may select a topic neural network(s) 112 from a store of topic neural network(s) 112 to be used during an instance of the application. For example, a teacher may select a topic neural network 112 that corresponds to a current subject matter he or she is teaching, a game streamer may select a topic neural network 112 corresponding to the type of game (e.g., first person shooter, basketball, strategy, etc.) and/or game title that the user is playing and/or streaming, a video content sharer may select a topic neural network 112 corresponding to a topic of the shared content (e.g., a cooking video, a "how-to" segment, an education series, etc.), etc.

Once the topic neural network(s) 112 have been selected (e.g., automatically by the system and/or manually by a user), the chat manager 102 may retrieve textual data 114 (and/or other data types, such as video and/or metadata) from the application 116. In some embodiments, chat comments input into the chat feature of the application 116 corresponding to the textual data 114 may be intercepted by the chat manager 102 (e.g., via one or more application programming interfaces (APIs)). The textual data 114 may be applied to the topic neural network(s) 112 and the topic neural network(s) 112 may output data to indicate whether the textual data 114 (and/or other data types) is relevant, and/or appropriate, or irrelevant, offensive, harassing, profane, otherwise inappropriate for the topic of discussion, or a combination thereof, etc.

Based on the output data from the topic neural network(s) 112, a comment display option 118 may be determined for a comment(s) corresponding to the textual data 114. For example, the comment(s) may be displayed, prioritized relative to the relevance of other comments, deleted/removed/filtered out from the chat feature included in the application 116 such that the comment is not displayed, de-emphasized, or otherwise filtered. In some embodiments, user preferences may be applied to the chat manager 102 to determine whether the comment display option 118 for a relevant comment indicates to simply allow the comment to be displayed or to prioritize, emphasize, and/or highlight the comment. Similarly, the user preferences may indicate whether a comment, or portion of a comment should be deleted, de-emphasized, or otherwise filtered. Each of the options for the comment display option 118 may be based on a confidence value for the relevance of a comment output by the topic neural network(s) 112. For example, if the topic neural network(s) 112 processes textual data 114 and outputs a confidence value that exceeds a threshold value indicating that the comment is irrelevant (or inappropriate, etc.), the comment associated with the textual data 114 may be deemphasized, removed, etc.

Turning to FIG. 1B, FIG. 1B illustrates a data flow diagram corresponding to a process 100B for an example chat management system. The chat management system may include chat manager 102B, which includes a transcript generator 106, a trigger determiner 120, a trigger dictionary 122, and a response option generator 122. The process 100B may further include stream data 104, application 116, and a response option 126. The application 116, stream data 104, and/or transcript generator 106 may be similar to those described with respect to FIG. 1A. However, depending on the embodiment, variations of these features and/or functionality may exist.

In operation, the chat manager 102B may receive the stream data 104 from the application 116, which may include a chat feature and be executed locally on a user device and/or may correspond to a cloud-based application executed within a cloud computing environment. Similar to the description with respect to the process 100A, the stream data 104 may be used by the transcript generator 106 to generate a transcript. Using the generated transcript, the trigger determiner 120 may determine that the transcript includes a trigger phrase and/or action (e.g., based on textual, contextual, video, metadata, and/or other data from the transcript). A trigger phrase may be determined based on comparing words from the transcript to the trigger dictionary 122, which may include a set of trigger phrases and/or actions (e.g., a single word, a single sound, a string of words, a sound pattern, a hand gesture, etc.), and determining that data from the transcript corresponds to one or more trigger phrases or actions. Additionally or alternatively, data representative of the transcript may be applied to a neural network used by the trigger determiner 120 to compute data indicative of a trigger phrase or trigger action.

In some embodiments, such as where the trigger determiner 120 may determine a trigger action (e.g., a gesture performed by a user or an input received by the system via a peripheral device) based on processing stream data 104, the stream data 104 may include data representative of a user performing a gesture in the air that is captured and processed via computer vision or the stream data 104 may include data representative of input from a user pressing a button on a presentation remote. This data may be processed by the trigger determiner 120 to determine a trigger action.

The response option generator 124 may receive the trigger phrase and/or trigger action. Based on the determined trigger phrase or action, the response option generator 124 may process additional data from the stream data 104—e.g., a question that follows the trigger—to determine one or more appropriate and/or relevant response option(s) 126. For example, a teacher may ask his/her class, "Did you read 'Macbeth' over the weekend?" Based on the trigger determiner 120 determining that the teacher asked a question (e.g., a trigger phrase), the response option generator 124 may determine that the only acceptable response options are "YES" or "NO". In some embodiments, the response option generator 124 may generate a graphical element for displaying the response option(s) 126 via the application 116. For example, based on the trigger phrase, the response option generator 124 may generate, and the application 116 may display, a selection box that includes selection buttons that allow students to only choose "YES" or "NO" response options to answer the teacher's question as to whether the students read Macbeth over the weekend. The selection box may be generated within a chat feature of the application 116, within another area of an attendee's display, and/or may be provided as a notification to a client device of an attendee, such as those described in FIG. 7. In some embodiments, the response option generator 124 may generate a selection box with several potential answers for attendees to select.

Figure 2:
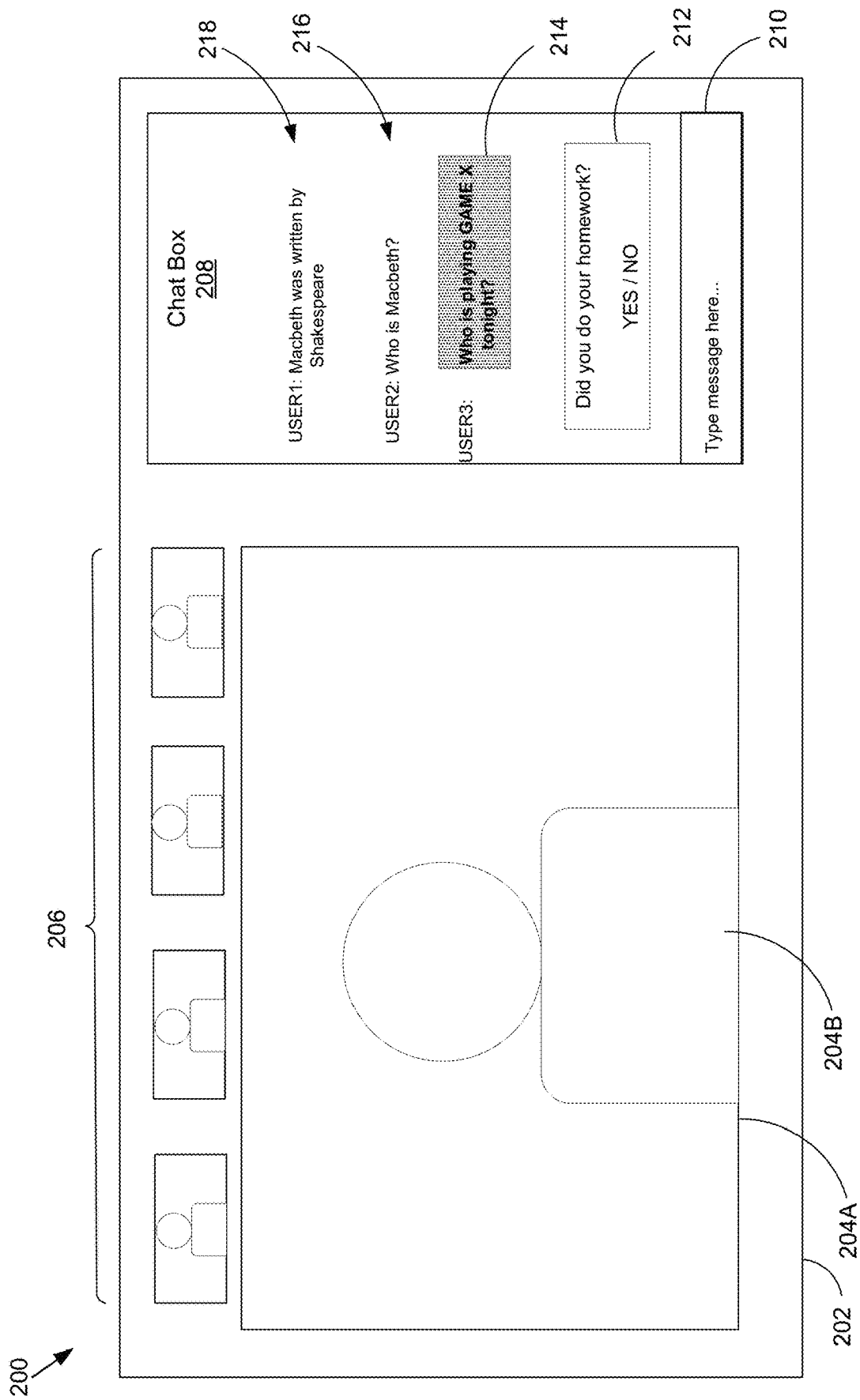
FIG. 2 is an example user interface for a video conference application, in accordance with some embodiments of the present disclosure.

Turning to FIG. 2, FIG. 2 is an example user interface 200 for a video conference application, in accordance with some embodiments of the present disclosure. The example user interface 200 includes an application viewing panel 202, a host streaming window 204A, a host 204B, a plurality of participant streaming windows 206, and a chat box 208. The chat box 208 includes an input field 210 and illustrates a response selection box 212, as well as several user comments 214, 216, and 218.

In operation, as the host 204B is speaking or presenting content during an instance of the video conference application, stream data 104 (e.g., audio data, video data, etc.) may be processed to determine a topic of discussion. Based on the determined topic(s), a corresponding topic neural network(s) 112 may be selected to manage comments input into the chat box 208. For example, if the host 204B is discussing Macbeth during the instance of the video conference application, one or more topic neural networks 112 trained using content relating to Macbeth (or more broadly to Shakespeare, or even more broadly to literature) may be selected based on processing a transcript of the discussion to determine that the host 204B is discussing Macbeth. Once the topic neural network 112 has been selected (e.g., automatically by the system and/or manually by a user, such as the teacher), comments input into the input field 210 may be retrieved and/or intercepted from the chat box 208 and applied to the one or more selected topic neural networks 112. Based on the relevance of a particular comment, the comment may be allowed, prioritized, deleted, de-emphasized, or otherwise filtered in the chat box 208. For example, the host 204B may ask the question, "Who is the main character in Macbeth?" In response, participants to the instance of the video conference application may input comments 214, 216, and 218 into the input field 210. Prior to displaying the comments in the chat box 208, each of these comments may be applied to the selected topic neural network 112 to determine the relevance (and/or appropriateness) of the comments. Based on the relevance, a display option may be determined. For example, comments 216 and 218 may both be considered relevant and, thus, may be displayed in the chat box 208. Further, comment 218 may be determined to be more relevant (e.g., more on topic) when compared to comment 216. As such, comment 218 may be emphasized and/or moved above comment 216 in the chat box 208. Comment 214 (e.g., reciting "Who is playing GAME X tonight?") may be determined to be irrelevant and, as such, may be obscured in the chat box 208. In some embodiments, comments that are obscured or filtered out during the instance of the video conference application may be recorded and sent to the host 204B after the termination of the instance of the video conference application. Advantageously, the host 204B may review these comments at a later time and answer any questions as needed. In some embodiments, the moderator, teacher, or other user may be presented with the irrelevant and/or relevant chat entries (e.g., some or all of the chat entries) such that the user may allow them, disallow them, prioritize them, etc. For example, the user may be presented with the text and/or semantic information related thereto (e.g., irrelevant but appropriate, or relevant but inappropriate, etc.), and may make a final determination as to the presentation of the text.

In some embodiments, based on determining that host 204B asked a question (e.g., a trigger phrase), the selection box 212 may be generated and displayed in the chat box 208. For example, the host 204B may ask the participants, "Did you do your homework?" Based on this question, the selection box 212 may include selection buttons to allow the participants to only choose "YES" or "NO" answer options. Participant selections may be recorded, sent to, and/or displayed for the host 204B.

Figure 3:
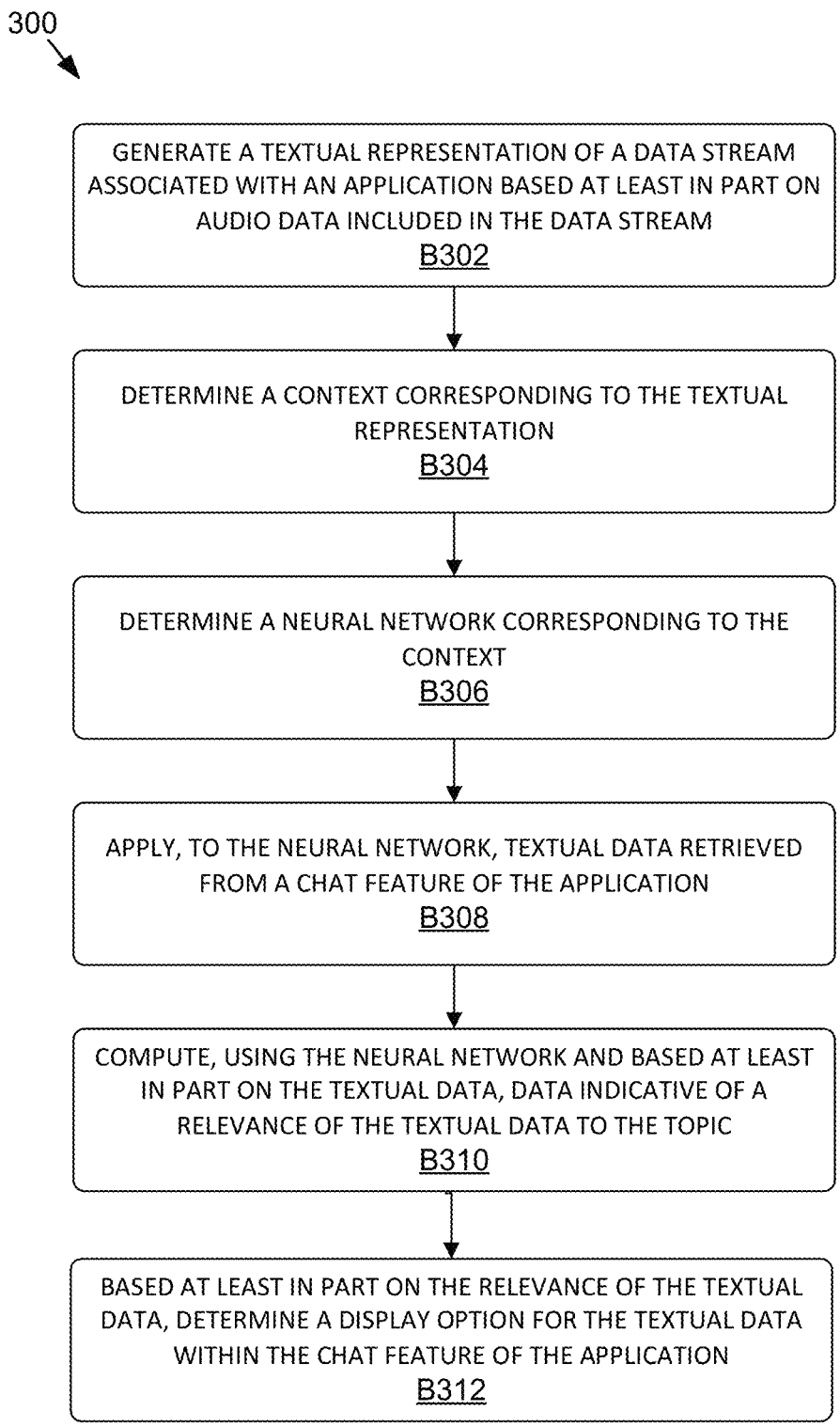
FIGS. 3 and 4 are flow diagrams showing methods for managing comments, in accordance with some embodiments of the present disclosure.
Figure 4:
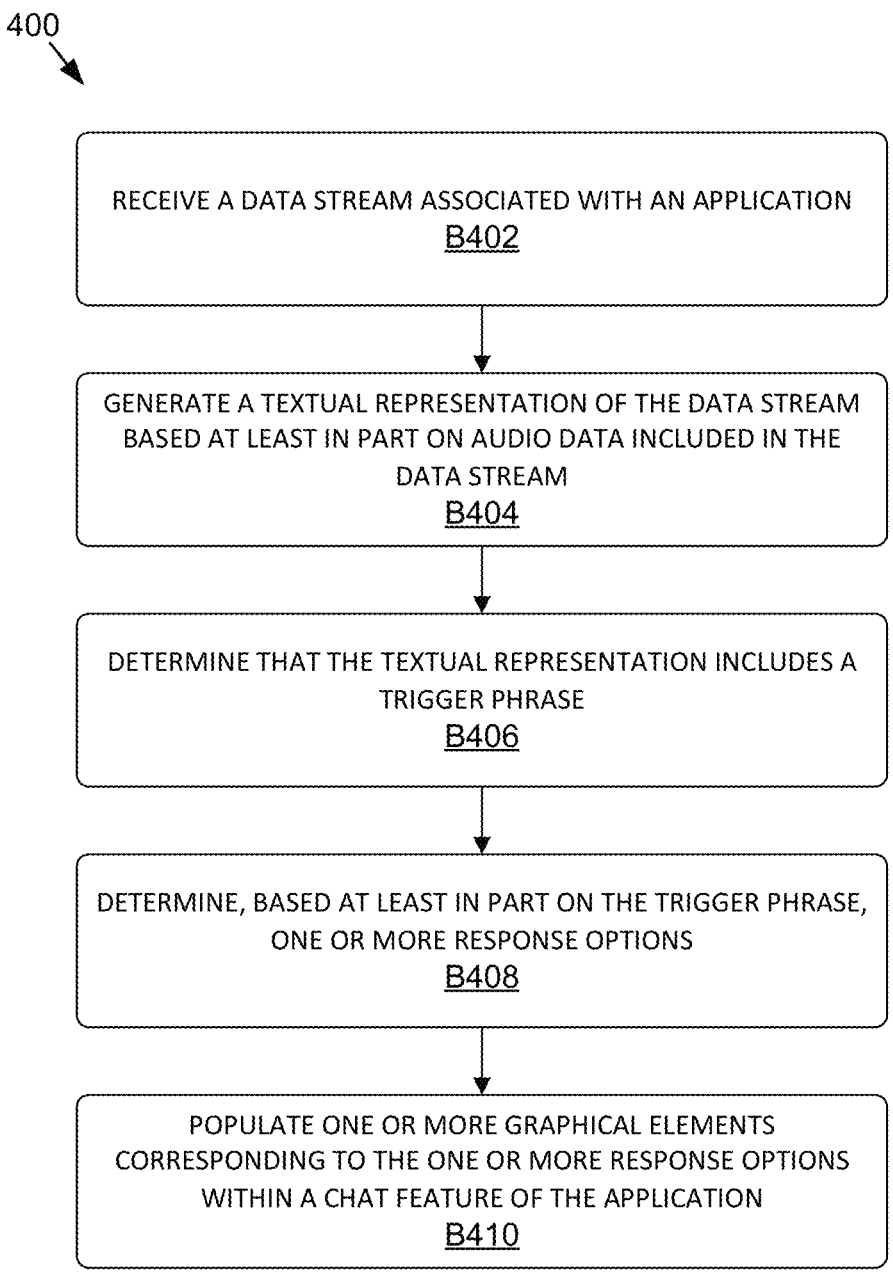

Now referring to FIGS. 3 and 4, each block of methods 300 and 400, described herein, comprises a computing process that may be performed using any combination of hardware, firmware, and/or software. For instance, various functions may be carried out by a processor executing instructions stored in memory. The methods 300 and 400 may also be embodied as computer-usable instructions stored on computer storage media. The methods 300 and 400 may be provided by a standalone application, a service or hosted service (standalone or in combination with another hosted service), or a plug-in to another product, to name a few. In addition, methods 300 and 400 are described, by way of example, with respect to the processes of FIG. 1A and FIG. 1B, respectively. However, these methods may additionally or alternatively be executed by any one system, or any combination of systems, including, but not limited to, those described herein.

FIG. 3 is a flow diagram showing a method 300 for managing comments, in accordance with some embodiments of the present disclosure. The method 300, at block B302, includes generating a textual representation of a data stream associated with an application based at least in part on audio data included in the data stream. For example, as a user is speaking or presenting content during an online video conference, the data stream (e.g., audio data, video data, etc.) may be processed to generate a textual representation (e.g., a transcript) of the audio and/or information relating to the video.

The method 300, a block B304, includes determining a context corresponding to the textual representation. For example, the textual representation and/or video related information may then be processed to determine a context of the discussion in a conference, a context of a video stream, a context of a game stream, and/or the like.

The method 300, a block B306, includes determining a neural network corresponding to the context. For example, based on the determined context(s), a corresponding topic neural network(s) 112 may be selected. The corresponding topic neural network 112 may be determined from a store of neural networks that may include any number of neural networks, each associated with a context or topic.

The method 300, a block B308, includes applying, to the neural network, textual data retrieved from a chat feature of the application. For example, once one or more topic neural networks 112 have been selected, comments may be retrieved from a chat feature of an application and applied to the topic neural network(s) 112.

The method 300, a block B310, includes computing, using the neural network and based at least in part on the textual data, data indicative of a relevance of the textual data to the topic. For example, comments determined to be relevant may be labeled as 'on-topic' and comments determined to be irrelevant may be labeled as 'off-topic'.

The method 300, a block B312, includes determining a display option for the textual data within the chat feature of the application based at least in part on the relevance of the textual data. For example, within the chat feature of an application, a comment may be displayed, prioritized relative to the relevance of other comments, deleted/removed such that the comment is not displayed, de-emphasized, or otherwise filtered. In some embodiments, a filter may be applied only to a portion of the comment. For example, an irrelevant portion of a comment may be deleted or obscured, while the relevant portion of the comment may be displayed within the chat feature.

FIG. 4 is a flow diagram showing a method 400 for managing comments, in accordance with some embodiments of the present disclosure. The method 400, at block B402, includes receiving a data stream associated with an application. For example, a chat management system may receive a data stream (e.g., audio data, video data, metadata, etc.) associated with an application, such as from a host device during an online video conference, video stream, game stream, and/or the like.

The method 400, at block B404, includes generating a textual representation of the data stream based at least in part on audio data included in the data stream. For example, as a user is speaking or presenting content during an online video conference, the data stream (e.g., audio data, video data, etc.) may be processed to generate a transcript of the audio and/or information relating to the video.

The method 400, at block B406, includes determining that the textual representation includes a trigger phrase. For example, after generating the transcript and/or the video related information, the system may process the information to determine whether the transcript includes a trigger phrase and/or the video information includes a triggering action.

The method 400, at block B408, includes determining, based at least in part on the trigger phrase, one or more response options. Based on determining that the teacher asked a "yes or no" question (e.g., a trigger phrase), the system may only accept "YES" or "NO" comments entered into the chat feature.

The method 400, at block B410, includes populating one or more graphical elements corresponding to the one or more response options within a chat feature of the application. For example, based on a teacher asking his/her class a "yes or no" question, the system may generate and display a selection box that includes selection buttons that allow students to only choose "YES" or "NO" answer options in response to the teacher's question as to whether the students read Macbeth over the weekend.

Example Content Streaming System

Figure 5:
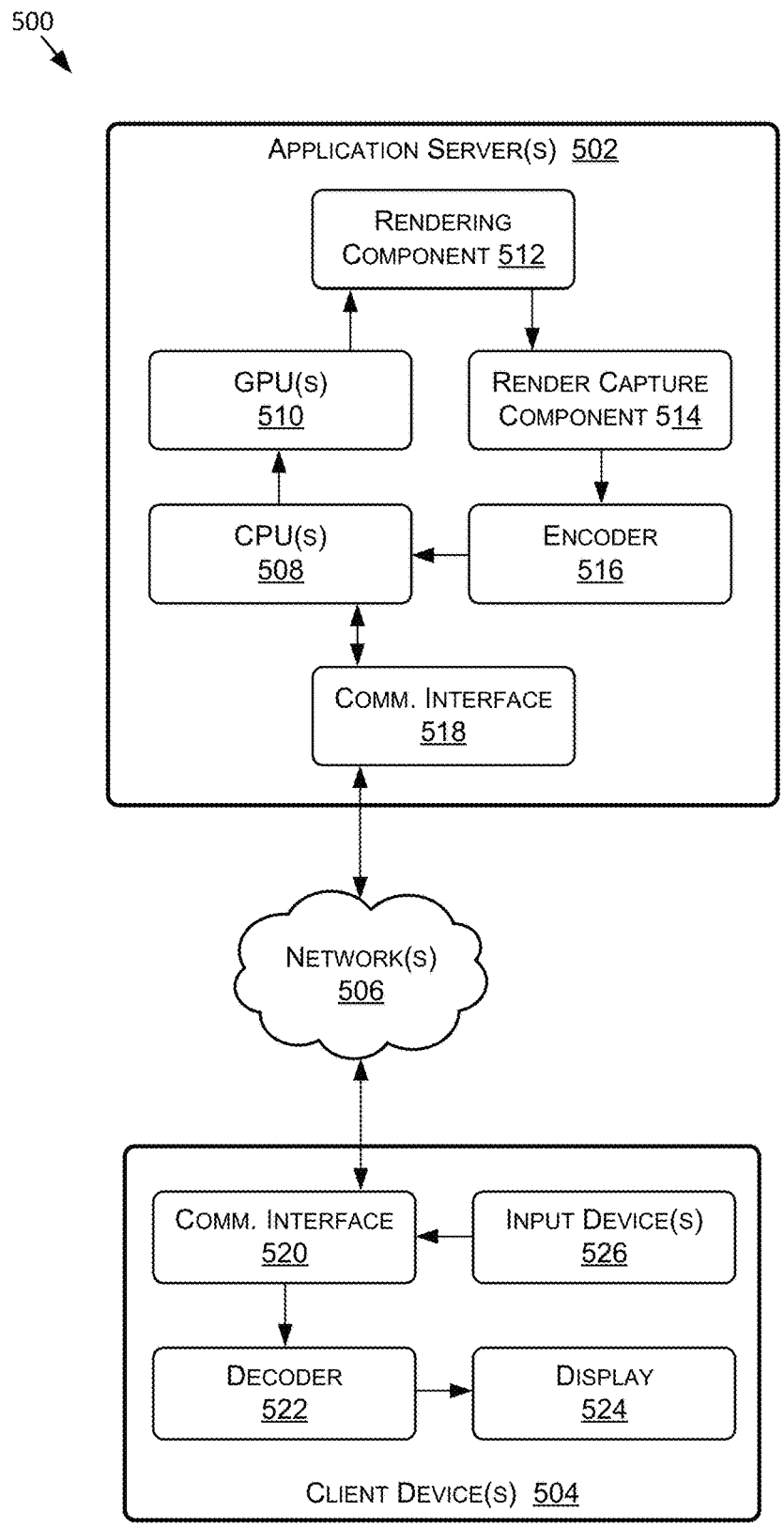
FIG. 5 is a block diagram of an example content streaming system suitable for use in implementing some embodiments of the present disclosure.

Now referring to FIG. 5, FIG. 5 is an example system diagram for a content streaming system 500, in accordance with some embodiments of the present disclosure. FIG. 5 includes application server(s) 502 (which may include similar components, features, and/or functionality to the example computing device 600 of FIG. 6), client device(s) 504 (which may include similar components, features, and/or functionality to the example computing device 600 of FIG. 6), and network(s) 506 (which may be similar to the network(s) described herein). In some embodiments of the present disclosure, the system 500 may be implemented. The application session may correspond to a game streaming application (e.g., NVIDIA GeFORCE NOW), a remote desktop application, a simulation application (e.g., autonomous or semi-autonomous vehicle simulation), computer aided design (CAD) applications, virtual reality (VR) and/or augmented reality (AR) streaming applications, deep learning applications, and/or other application types.

In the system 500, for an application session, the client device(s) 504 may only receive input data in response to inputs to the input device(s), transmit the input data to the application server(s) 502, receive encoded display data from the application server(s) 502, and display the display data on the display 524. As such, the more computationally intense computing and processing is offloaded to the application server(s) 502 (e.g., rendering—in particular ray or path tracing—for graphical output of the application session is executed by the GPU(s) of the game server(s) 502). In other words, the application session is streamed to the client device(s) 504 from the application server(s) 502, thereby reducing the requirements of the client device(s) 504 for graphics processing and rendering.

For example, with respect to an instantiation of an application session, a client device 504 may be displaying a frame of the application session on the display 524 based on receiving the display data from the application server(s) 502. The client device 504 may receive an input to one of the input device(s) and generate input data in response. The client device 504 may transmit the input data to the application server(s) 502 via the communication interface 520 and over the network(s) 506 (e.g., the Internet), and the application server(s) 502 may receive the input data via the communication interface 518. The CPU(s) may receive the input data, process the input data, and transmit data to the GPU(s) that causes the GPU(s) to generate a rendering of the application session. For example, the input data may be representative of a movement of a character of the user in a game session of a game application, firing a weapon, reloading, passing a ball, turning a vehicle, etc. The rendering component 512 may render the application session (e.g., representative of the result of the input data) and the render capture component 514 may capture the rendering of the application session as display data (e.g., as image data capturing the rendered frame of the application session). The rendering of the application session may include ray or path-traced lighting and/or shadow effects, computed using one or more parallel processing units—such as GPUs, which may further employ the use of one or more dedicated hardware accelerators or processing cores to perform ray or path-tracing techniques—of the application server(s) 502. In some embodiments, one or more virtual machines (VMs)— e.g., including one or more virtual components, such as vGPUs, vCPUs, etc.—may be used by the application server(s) 502 to support the application sessions. The encoder 516 may then encode the display data to generate encoded display data and the encoded display data may be transmitted to the client device 504 over the network(s) 506 via the communication interface 518. The client device 504 may receive the encoded display data via the communication interface 520 and the decoder 522 may decode the encoded display data to generate the display data. The client device 504 may then display the display data via the display 524.

Example Computing Device

Figure 6:
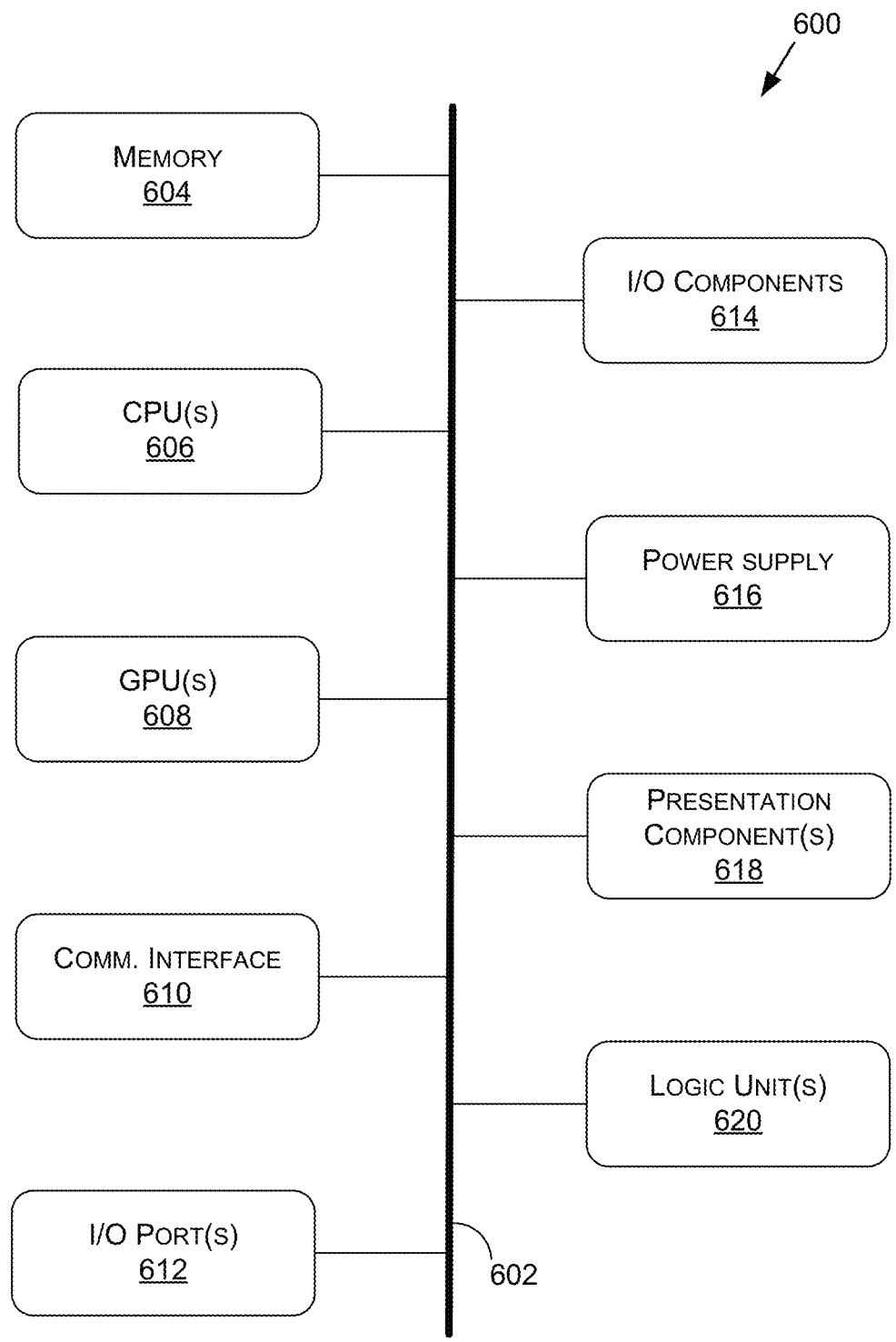
FIG. 6 is a block diagram of an example computing device suitable for use in implementing some embodiments of the present disclosure.

FIG. 6 is a block diagram of an example computing device(s) 600 suitable for use in implementing some embodiments of the present disclosure. Computing device 600 may include an interconnect system 602 that directly or indirectly couples the following devices: memory 604, one or more central processing units (CPUs) 606, one or more graphics processing units (GPUs) 608, a communication interface 610, input/output (I/O) ports 612, input/output components 614, a power supply 616, one or more presentation components 618 (e.g., display(s)), and one or more logic units 620. In at least one embodiment, the computing device(s) 600 may comprise one or more virtual machines (VMs), and/or any of the components thereof may comprise virtual components (e.g., virtual hardware components). For non-limiting examples, one or more of the GPUs 608 may comprise one or more vGPUs, one or more of the CPUs 606 may comprise one or more vCPUs, and/or one or more of the logic units 620 may comprise one or more virtual logic units. As such, a computing device(s) 600 may include discrete components (e.g., a full GPU dedicated to the computing device 600), virtual components (e.g., a portion of a GPU dedicated to the computing device 600), or a combination thereof.

Although the various blocks of FIG. 6 are shown as connected via the interconnect system 602 with lines, this is not intended to be limiting and is for clarity only. For example, in some embodiments, a presentation component 618, such as a display device, may be considered an I/O component 614 (e.g., if the display is a touch screen). As another example, the CPUs 606 and/or GPUs 608 may include memory (e.g., the memory 604 may be representative of a storage device in addition to the memory of the GPUs 608, the CPUs 606, and/or other components). In other words, the computing device of FIG. 6 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 6.

The interconnect system 602 may represent one or more links or busses, such as an address bus, a data bus, a control bus, or a combination thereof. The interconnect system 602 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 606 may be directly connected to the memory 604. Further, the CPU 606 may be directly connected to the GPU 608. Where there is direct, or point-to-point connection between components, the interconnect system 602 may include a PCIe link to carry out the connection. In these examples, a PCI bus need not be included in the computing device 600.

The memory 604 may include any of a variety of computer-readable media. The computer-readable media may be any available media that may be accessed by the computing device 600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 604 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 600. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 606 may be configured to execute at least some of the computer-readable instructions to control one or more components of the computing device 600 to perform one or more of the methods and/or processes described herein. The CPU(s) 606 may each include one or more cores (e.g., one, two, four, eight, twenty-eight, seventy-two, etc.) that are capable of handling a multitude of software threads simultaneously. The CPU(s) 606 may include any type of processor, and may include different types of processors depending on the type of computing device 600 implemented (e.g., processors with fewer cores for mobile devices and processors with more cores for servers). For example, depending on the type of computing device 600, the processor may be an Advanced RISC Machines (ARM) processor implemented using Reduced Instruction Set Computing (RISC) or an x86 processor implemented using Complex Instruction Set Computing (CISC). The computing device 600 may include one or more CPUs 606 in addition to one or more microprocessors or supplementary co-processors, such as math co-processors.

In addition to or alternatively from the CPU(s) 606, the GPU(s) 608 may be configured to execute at least some of the computer-readable instructions to control one or more components of the computing device 600 to perform one or more of the methods and/or processes described herein. One or more of the GPU(s) 608 may be an integrated GPU (e.g., with one or more of the CPU(s) 606 and/or one or more of the GPU(s) 608 may be a discrete GPU. In embodiments, one or more of the GPU(s) 608 may be a coprocessor of one or more of the CPU(s) 606. The GPU(s) 608 may be used by the computing device 600 to render graphics (e.g., 3D graphics) or perform general purpose computations. For example, the GPU(s) 608 may be used for General-Purpose computing on GPUs (GPGPU). The GPU(s) 608 may include hundreds or thousands of cores that are capable of handling hundreds or thousands of software threads simultaneously. The GPU(s) 608 may generate pixel data for output images in response to rendering commands (e.g., rendering commands from the CPU(s) 606 received via a host interface). The GPU(s) 608 may include graphics memory, such as display memory, for storing pixel data or any other suitable data, such as GPGPU data. The display memory may be included as part of the memory 604. The GPU(s) 608 may include two or more GPUs operating in parallel (e.g., via a link). The link may directly connect the GPUs (e.g., using NVLINK) or may connect the GPUs through a switch (e.g., using NVSwitch). When combined together, each GPU 608 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 606 and/or the GPU(s) 608, the logic unit(s) 620 may be configured to execute at least some of the computer-readable instructions to control one or more components of the computing device 600 to perform one or more of the methods and/or processes described herein. In embodiments, the CPU(s) 606, the GPU(s) 608, and/or the logic unit(s) 620 may discretely or jointly perform any combination of the methods, processes and/or portions thereof. One or more of the logic units 620 may be part of and/or integrated in one or more of the CPU(s) 606 and/or the GPU(s) 608 and/or one or more of the logic units 620 may be discrete components or otherwise external to the CPU(s) 606 and/or the GPU(s) 608. In embodiments, one or more of the logic units 620 may be a coprocessor of one or more of the CPU(s) 606 and/or one or more of the GPU(s) 608.

Examples of the logic unit(s) 620 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 610 may include one or more receivers, transmitters, and/or transceivers that enable the computing device 600 to communicate with other computing devices via an electronic communication network, included wired and/or wireless communications. The communication interface 610 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 612 may enable the computing device 600 to be logically coupled to other devices including the I/O components 614, the presentation component(s) 618, and/or other components, some of which may be built in to (e.g., integrated in) the computing device 600. Illustrative I/O components 614 include a microphone, mouse, keyboard, joystick, game pad, game controller, satellite dish, scanner, printer, wireless device, etc. The I/O components 614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may be include depth cameras, such as stereoscopic camera systems, infrared camera systems, RGB camera systems, touchscreen technology, and combinations of these, for gesture detection and recognition. Additionally, the computing device 600 may include accelerometers or gyroscopes (e.g., as part of an inertia measurement unit (IMU)) that enable detection of motion. In some examples, the output of the accelerometers or gyroscopes may be used by the computing device 600 to render immersive augmented reality or virtual reality.

The power supply 616 may include a hard-wired power supply, a battery power supply, or a combination thereof. The power supply 616 may provide power to the computing device 600 to enable the components of the computing device 600 to operate.

The presentation component(s) 618 may include a display (e.g., a monitor, a touch screen, a television screen, a heads-up-display (HUD), other display types, or a combination thereof), speakers, and/or other presentation components. The presentation component(s) 618 may receive data from other components (e.g., the GPU(s) 608, the CPU(s) 606, etc.), and output the data (e.g., as an image, video, sound, etc.).

Example Data Center

Figure 7:
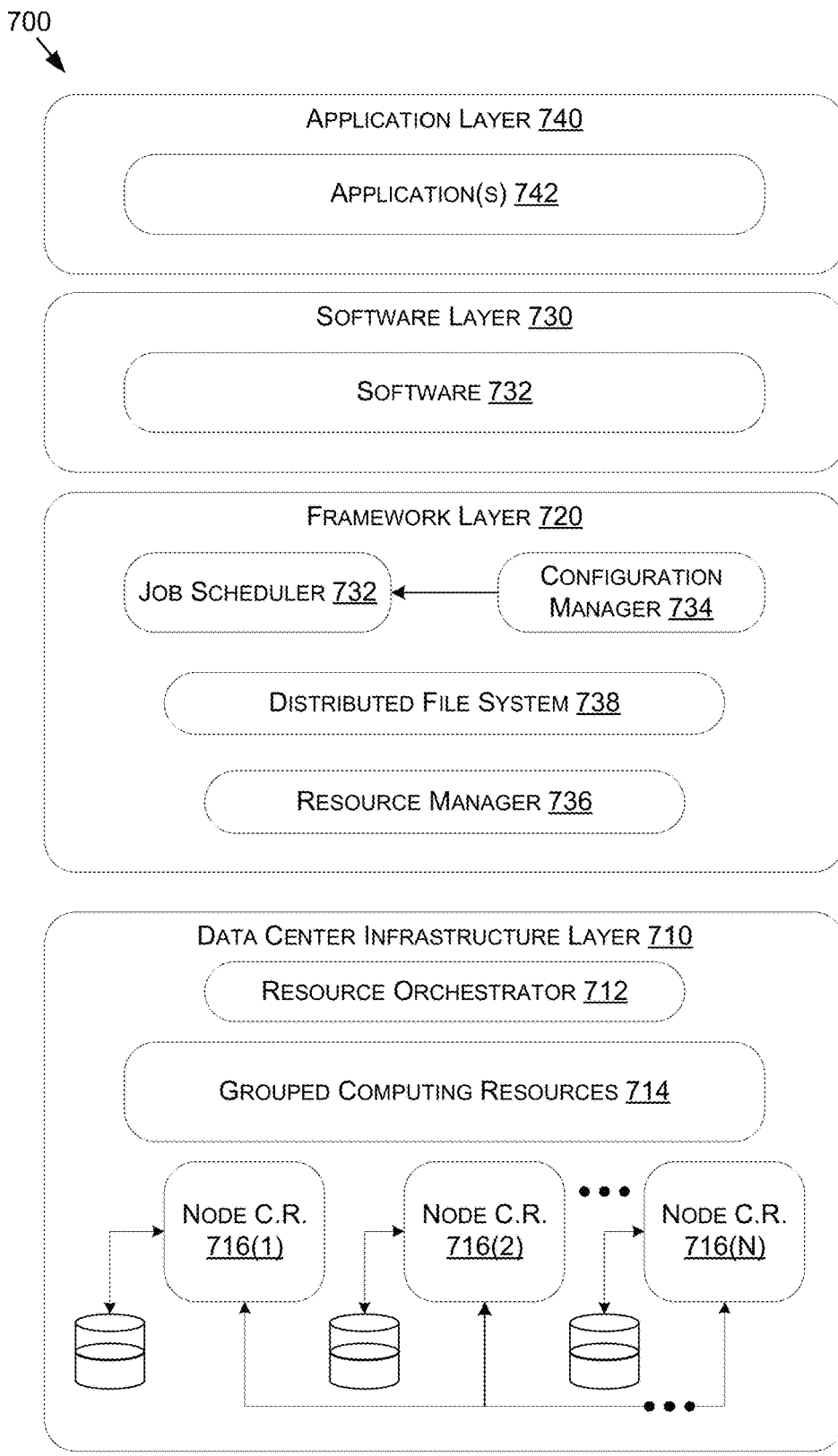
FIG. 7 is a block diagram of an example data center suitable for use in implementing some embodiments of the present disclosure.

FIG. 7 illustrates an example data center 700 that may be used in at least one embodiments of the present disclosure. The data center 700 may include a data center infrastructure layer 710, a framework layer 720, a software layer 730, and/or an application layer 740.

As shown in FIG. 7, the data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units ("CPUs") or other processors (including accelerators, field programmable gate arrays (FPGAs), graphics processors or graphics processing units (GPUs), etc.), memory devices (e.g., dynamic read-only memory), storage devices (e.g., solid state or disk drives), network input/output ("NW I/O") devices, network switches, virtual machines ("VMs"), power modules, and/or cooling modules, etc. In some embodiments, one or more node C.R.s from among node C.R.s 716(1)-716(N) may correspond to a server having one or more of the above-mentioned computing resources. In addition, in some embodiments, the node C.R.s 716(1)-7161(N) may include one or more virtual components, such as vGPUs, vCPUs, and/or the like, and/or one or more of the node C.R.s 716(1)-716(N) may correspond to a virtual machine (VM).

In at least one embodiment, grouped computing resources 714 may include separate groupings of node C.R.s 716 housed within one or more racks (not shown), or many racks housed in data centers at various geographical locations (also not shown). Separate groupings of node C.R.s 716 within grouped computing resources 714 may include grouped compute, network, memory or storage resources that may be configured or allocated to support one or more workloads. In at least one embodiment, several node C.R.s 716 including CPUs, GPUs, and/or other processors may be grouped within one or more racks to provide compute resources to support one or more workloads. The one or more racks may also include any number of power modules, cooling modules, and/or network switches, in any combination.

The resource orchestrator 722 may configure or otherwise control one or more node C.R.s 716(1)-716(N) and/or grouped computing resources 714. In at least one embodiment, resource orchestrator 722 may include a software design infrastructure ("SDI") management entity for the data center 700. The resource orchestrator 722 may include hardware, software, or some combination thereof.

In at least one embodiment, as shown in FIG. 7, framework layer 720 may include a job scheduler 732, a configuration manager 734, a resource manager 736, and/or a distributed file system 738. The framework layer 720 may include a framework to support software 732 of software layer 730 and/or one or more application(s) 742 of application layer 740. The software 732 or application(s) 742 may respectively include web-based service software or applications, such as those provided by Amazon Web Services, Google Cloud and Microsoft Azure. The framework layer 720 may be, but is not limited to, a type of free and open-source software web application framework such as Apache Spark™ (hereinafter "Spark") that may utilize distributed file system 738 for large-scale data processing (e.g., "big data"). In at least one embodiment, job scheduler 732 may include a Spark driver to facilitate scheduling of workloads supported by various layers of data center 700. The configuration manager 734 may be capable of configuring different layers such as software layer 730 and framework layer 720 including Spark and distributed file system 738 for supporting large-scale data processing. The resource manager 736 may be capable of managing clustered or grouped computing resources mapped to or allocated for support of distributed file system 738 and job scheduler 732. In at least one embodiment, clustered or grouped computing resources may include grouped computing resource 714 at data center infrastructure layer 710. The resource manager 1036 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 738 of framework layer 720. One or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 738 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 734, resource manager 736, and resource orchestrator 712 may implement any number and type of self-modifying actions based on any amount and type of data acquired in any technically feasible fashion. Self-modifying actions may relieve a data center operator of data center 700 from making possibly bad configuration decisions and possibly avoiding underutilized and/or poor performing portions of a data center.

The data center 700 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 700. In at least one embodiment, trained or deployed machine learning models corresponding to one or more neural networks may be used to infer or predict information using resources described above with respect to the data center 700 by using weight parameters calculated through one or more training techniques, such as but not limited to those described herein.

In at least one embodiment, the data center 700 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 600 of FIG. 6—e.g., each device may include similar components, features, and/or functionality of the computing device(s) 600. In addition, where backend devices (e.g., servers, NAS, etc.) are implemented, the backend devices may be included as part of a data center 700, an example of which is described in more detail herein with respect to FIG. 7.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 600 described herein with respect to FIG. 6. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
    determining a context corresponding to audio data from a data stream;
    selecting, based at least on the determined context, at least one natural language processing (NLP) machine learning model from at least two NLP machine learning models, each of the at least two NLP machine learning models having a different level of breadth to evaluate a relevance of textual data to the context;
    computing, using the at least one NLP machine learning model and based at least on the textual data, data indicative of the relevance of the textual data to the determined context evaluated at the different level of breadth that corresponds to the at least one NLP machine learning model; and
    filtering, based at least on the relevance, the textual data for a display of the textual data in an interface of an application associated with the data stream.

2. The method of claim 1, further comprising determining a breadth level corresponding to the at least one NLP machine learning model, wherein the selecting is further based at least on the breadth level.

3. The method of claim 1, wherein the selecting is based at least on associating a breadth level with the at least one NLP machine learning model using a hierarchical data structure corresponding to the at least two NLP machine learning models with relative breadth levels corresponding to the context.

4. The method of claim 1, further comprising receiving the textual data from a chat feature of the application, wherein the display of the textual data is within the chat feature.

5. The method of claim 1, wherein the at least two NLP machine learning models include a first neural network to output a first prediction of the relevance evaluated at a first level of breadth and a second neural network to output a second prediction of the relevance evaluated at a second level of breadth.

6. The method of claim 1, further comprising:
computing, using the at least one NLP machine learning model and based at least on the textual data, data indicating whether the textual data is offensive or inoffensive, wherein the display of the textual data in the interface of the application is further based at least on whether the textual data is offensive or inoffensive.

7. The method of claim 1, wherein the context comprises a topic of discussion for one or more users of the application.

8. The method of claim 1, wherein the application includes at least one of a game streaming application, a video conferencing application, or a video streaming application.

9. A system comprising:
one or more processors to execute operations including:
determining a context corresponding to a data stream;
selecting, based at least on the determined context, at least one natural language processing (NLP) machine learning model from at least two NLP machine learning models, each of the at least two NLP machine learning models having a different level of breadth to evaluate a relevance of textual data to the context;
computing, using the at least one NLP machine learning model and based at least on the textual data, data indicative of the relevance of the textual data to the determined context evaluated at the different level of breadth that corresponds to the at least one NLP machine learning model; and
presenting, based at least on the relevance, the textual data using an interface of an application associated with the data stream.

10. The system of claim 9, wherein the operations further comprise determining a breadth level corresponding to the at least one NLP machine learning model, wherein the selecting is further based at least on the breadth level.

11. The system of claim 9, wherein the selecting is based at least on associating a breadth level with the at least one NLP machine learning model using a hierarchical data structure corresponding to the at least two NLP machine learning models with relative breadth levels corresponding to the context.

12. The system of claim 9, wherein the operations further include receiving the textual data from a chat feature of the application, wherein the presentation of the textual data is within the chat feature.

13. The system of claim 9, wherein the determining the context corresponding to the data stream includes applying audio data from the application to one or more NLP machine learning models.

14. The system of claim 9, further comprising:
computing, using the at least one NLP machine learning model and based at least on the textual data, data indicating whether the textual data is offensive or inoffensive, wherein the presenting is further based at least on whether the textual data is offensive or inoffensive.

15. The system of claim 9, wherein the system is comprised in at least one of:
a control system for an autonomous or semi-autonomous machine;
a perception system for an autonomous or semi-autonomous machine;
a system for performing simulation operations;
a system for performing light transport simulation;
a system for performing deep learning operations;
a system implemented using an edge device;
a system implemented using a robot;
a system for presenting at least one of virtual reality content or augmented reality content;
a system incorporating one or more virtual machines (VMs);
a system implemented at least partially in a data center; or
a system implemented at least partially using cloud computing resources.

16. At least one processor comprising:
one or more circuits to present textual data from an application associated with a data stream using data computed based at least on applying the textual data to at least one natural language processing (NLP) machine learning model,
the at least one NLP machine learning model selected, based at least on a determined context of the data stream, from at least two NLP machine learning models, each of the at least two NLP machine learning models having a different level of scope to evaluate a relevance of the textual data to the context.

17. The at least one processor of claim 16, wherein the one or more circuits are further to determine a scope corresponding to the context, wherein the at least one NLP machine learning model is selected based at least on the scope corresponding to the context.

18. The at least one processor of claim 16, wherein the at least one NLP machine learning model is selected based at least on associating a scope corresponding to the context with the at least one NLP machine learning model using a hierarchical arrangement of the at least two NLP machine learning models with relative scopes corresponding to the context.

19. The at least one processor of claim 16, wherein the one or more circuits are further to receive the textual data from a chat feature of the application, wherein the presentation of the textual data is within the chat feature.

20. The at least one processor of claim 16, wherein the processor is comprised in at least one of:
a control system for an autonomous or semi-autonomous machine;
a perception system for an autonomous or semi-autonomous machine;
a system for performing simulation operations;
a system for performing light transport simulation;
a system for performing deep learning operations;
a system implemented using an edge device;
a system implemented using a robot;
a system for presenting at least one of virtual reality content or augmented reality content;
a system incorporating one or more virtual machines (VMs);
a system implemented at least partially in a data center; or
a system implemented at least partially using cloud computing resources.

* * * * *